(12) United States Patent
Lappe et al.

(10) Patent No.: US 7,905,719 B2
(45) Date of Patent: Mar. 15, 2011

(54) BLOW MOLD

(75) Inventors: Ulrich Lappe, Regensburg (DE); Helmut Asbrand, Bad Abbach (DE)

(73) Assignee: Krones AG, Neutraubling (DE)

( * ) Notice: Subject to any disclaimer, the term of this patent is extended or adjusted under 35 U.S.C. 154(b) by 389 days.

(21) Appl. No.: 12/028,170

(22) Filed: Feb. 8, 2008

(65) Prior Publication Data
US 2008/0206390 A1 Aug. 28, 2008

(30) Foreign Application Priority Data

Feb. 27, 2007 (DE) .................... 20 2007 002 873 U

(51) Int. Cl.
*B29C 49/48* (2006.01)
(52) U.S. Cl. ....................................... 425/522
(58) Field of Classification Search .................. 425/522, 425/525, 529, 535, 540
See application file for complete search history.

(56) References Cited

U.S. PATENT DOCUMENTS

| 3,211,543 A | * | 10/1965 | Koop | ........................ | 249/141 |
| 6,113,377 A | | 9/2000 | Clark | | |
| 6,179,143 B1 | | 1/2001 | Grob | | |
| 6,948,924 B2 | * | 9/2005 | Tsau et al. | ...................... | 425/195 |
| 7,648,355 B2 | * | 1/2010 | Dannebey | ..................... | 425/182 |

FOREIGN PATENT DOCUMENTS

| EP | 1 188 543 A2 | 3/2002 |
| EP | 0 734 836 B1 | 9/2002 |
| EP | 1 332 862 A2 | 8/2003 |
| WO | WO 97/07965 | 3/1997 |
| WO | WO 01/85435 A1 | 11/2001 |
| WO | WO 2005/025835 A1 | 3/2005 |
| WO | WO 2005/042231 A1 | 5/2005 |

* cited by examiner

*Primary Examiner* — Robert B Davis
(74) *Attorney, Agent, or Firm* — Marshall, Gerstein & Borun LLP

(57) ABSTRACT

Blow mold for producing plastic containers, having a base body in the interior of which a body of the container to be produced can be accommodated and the inside wall of which completely surrounds the container that is to be produced, such that the blow mold has a ring for supporting a neck of the container with respect to the blow mold, along with a spacer device protruding inward with respect to the circumferential edge of the ring, for preventing the body of the container from coming in contact with the inside wall of the blow mold in the event of tilting of the container with respect to the blow mold.

15 Claims, 3 Drawing Sheets

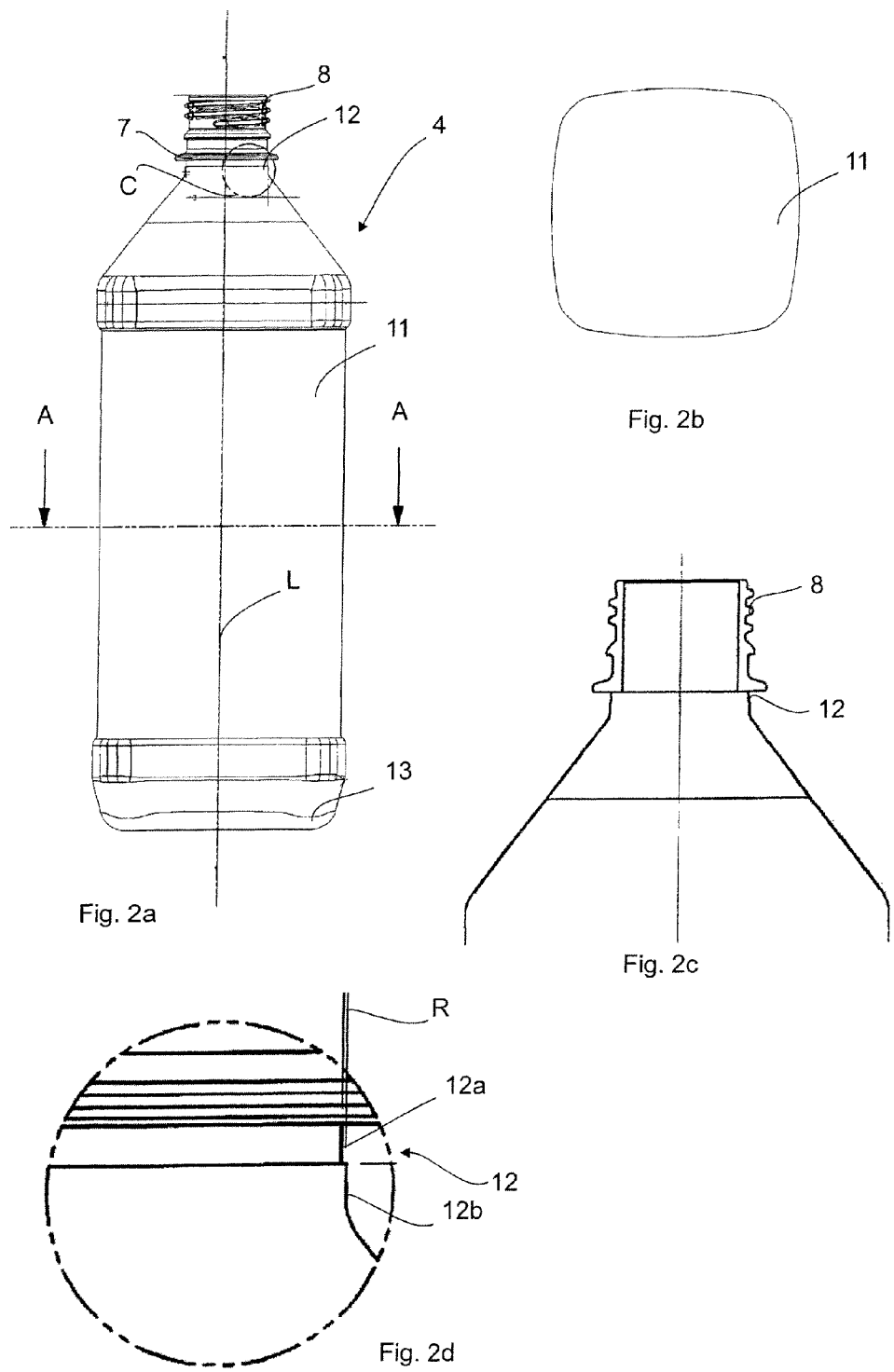

BLOW MOLD

The present application claims the benefit of priority of German Patent Application No. 20 2007 002 873.3, filed on Feb. 27, 2007. The entire text of the priority application is incorporated herein by reference in its entirety.

FIELD OF THE DISCLOSURE

The present disclosure relates to a blow mold for the production of plastic containers, such as used in beverage bottling operations.

BACKGROUND

In the area of the beverage industry in particular, plastic bottles have for a long time been used in addition to glass bottles for bottled beverages. In the production of these plastic bottles, a plastic blank, also called a parison or preform, may be heated, placed in a blow mold and then blow molded to its final size. This is usually done by using blow molds, which are closed around the outside of the blank to be blow molded, and then compressed air is injected through the opening in the mold.

The mouthpiece of the future bottle is already completed on the parison and is not processed further. For the actual blowing operation, a circumferential edge or collar of the parison rests on a circumferential edge of the blow mold, thus preventing the parison from collapsing into the interior of the blow mold.

In other words, as soon as the blow mold is closed, the parison, i.e., the so-called perform, lies directly on a plane of the blow mold and/or a ring, which is also referred to as the neck plate, before the stretch blow molding operation.

A spring-loaded grip is generally used for feeding the parison into the blow mold. Following this, the mold is closed and then the spring-loaded grip is tightened. In this stage of production, the preform may become tilted slightly in the blow mold because a mold gap must be maintained between the preform and the blow mold at this point. This mold gap is necessary to ensure clean closing of the blow mold. The size of this gap between the preform and the blow mold is usually between 0.25 mm and 0.4 mm.

When there are large mold gaps in particular, it may happen that a one-sided contact with the inside wall of the blow mold occurs with the above-mentioned slight tilting of the preform when the grip is removed. At this contact point, the hot preform cools slightly, but after the blow molding operation, this contact may result in the bottle having a one-sided accumulation of material, which is also known as a quenching lens, beneath the supporting ring.

Therefore, the object of the present disclosure is to rule out or at least reduce the risk of development of such a quenching lens. The inventive blow mold for producing plastic containers has a base body, which is preferably closable; the body of the container to be produced can be held in the interior of this base body; the inside wall of this base body, in particular in the closed state, completely surrounds the body of the container to be held. The blow mold here has a circumferential edge for supporting the neck of the container with respect to the blow mold.

According to the present disclosure, a spacer device that protrudes toward the inside with respect to the blow mold and/or the circumferential edge is provided on the circumferential edge, preventing the body of the container from coming in contact with the inside wall of the blow mold in the event the container becomes tilted with respect to the blow mold.

The circumferential edge of the blow mold may be designed in one piece with the blow mold but the circumferential edge is preferably part of a ring on which the bottle, i.e., the preform, rests during the blowing operation. More precisely, the collar or a circumferential edge of the bottle rests on this circumferential edge. Support of the container with respect to the blow mold is understood in particular to refer to the fact that before the blowing operation, the container and the blow mold are in contact only at said collar of the container and preferably there are no other points of contact between the container and the inside wall of the blow mold.

The spacer device is preferably designed in one piece with the ring and protrudes inward with respect to an opening formed by the ring.

The spacer device is preferably designed in the form of a ring, such that it completely surrounds a section of the container. This ring-shaped spacer device is designed especially preferably in one piece with the ring. In addition, however, it would also be conceivable for the spacer device to have a plurality of protrusions extending radially inward with respect to the blow mold and/or the ring and extending in the direction of the longitudinal axis of the container. The diameter of the opening formed by the ring is thus reduced by the spacer device.

The spacer device is preferably flush with the circumferential edge upwardly. This means that the spacer device protrudes up out of the circumferential edge and/or the ring and thus the collar of the container with its underside do not come in contact with this spacer device at all or do not come in contact with it exclusively. In addition, the spacer device in this embodiment is connected directly to the circumferential edge toward the bottom. This will be explained in greater detail below with reference to the figures.

In another embodiment, the spacer device has a rectangular cross section in its circumferential direction. Although, as mentioned above, the spacer device is designed as a ring, this ring in turn has said rectangular cross-section in its circumferential direction. In particular, the transition between the spacer device and the centering ring and/or the blow mold is selected to be sharp-edged and without a burr.

The spacer device 10 preferably has a length of between 0.5 mm and 8 mm, preferably between 1 mm and 4 mm and more preferably between 1.5 mm and 3 mm in the longitudinal direction of the container 4. A length in the range of 2 mm has proven to be especially advantageous to prevent tilting of the container and thus the quenching lenses mentioned above, while on the other hand not having an excessively negative effect on the container production process. In other words, by narrowing this area beneath the collar of the container, the tilt angle is reduced. In addition, this also achieves the result that the mold contact occurs in the (immediate) vicinity of the supporting ring and/or the area in which the collar of the container is supported. This is not problematical because the plastic material is still cold in these areas and thus not participate in the stretch blow molding operation.

The disclosure narrowing of the area beneath the collar and/or the spacer device is advantageous in particular with such blow molds that produce a steep bottleneck such as that on a contoured bottle, for example.

Both the circumferential edge and the spacer device on the ring mentioned above are thus advantageously arranged there.

The present disclosure is also directed at a ring for a blow mold of the type described above such that this ring has a planar circumferential edge on which may be supported a collar of a container that is to be processed and in particular is to be blow molded.

In addition, a cylindrical section is provided, extending essentially perpendicular to the plane of the circumferential edge. A spacer device extending radially inward with regard to this cylindrical section is provided on this cylindrical section according to this disclosure. This spacer device preferably has a circular cross section.

BRIEF DESCRIPTION OF THE DRAWINGS

Other advantages and embodiments are derived from the accompanying drawings, in which:

FIG. 2a shows a first view of a container to be produced;

FIG. 2b shows a top view of the container from FIG. 2a along lines A-A from FIG. 2a;

FIG. 2c shows a top view of an upper area of the container from FIG. 2a;

FIG. 2d shows a detailed view of the detail C from FIG. 2a;

FIG. 3b shows an inclined view of the ring half from FIG. 3a;

FIG. 3c shows a side view of the ring half from FIG. 3a; and

DETAILED DESCRIPTION OF THE PREFERRED EMBODIMENTS

Figures 1A, 1B, 1C:
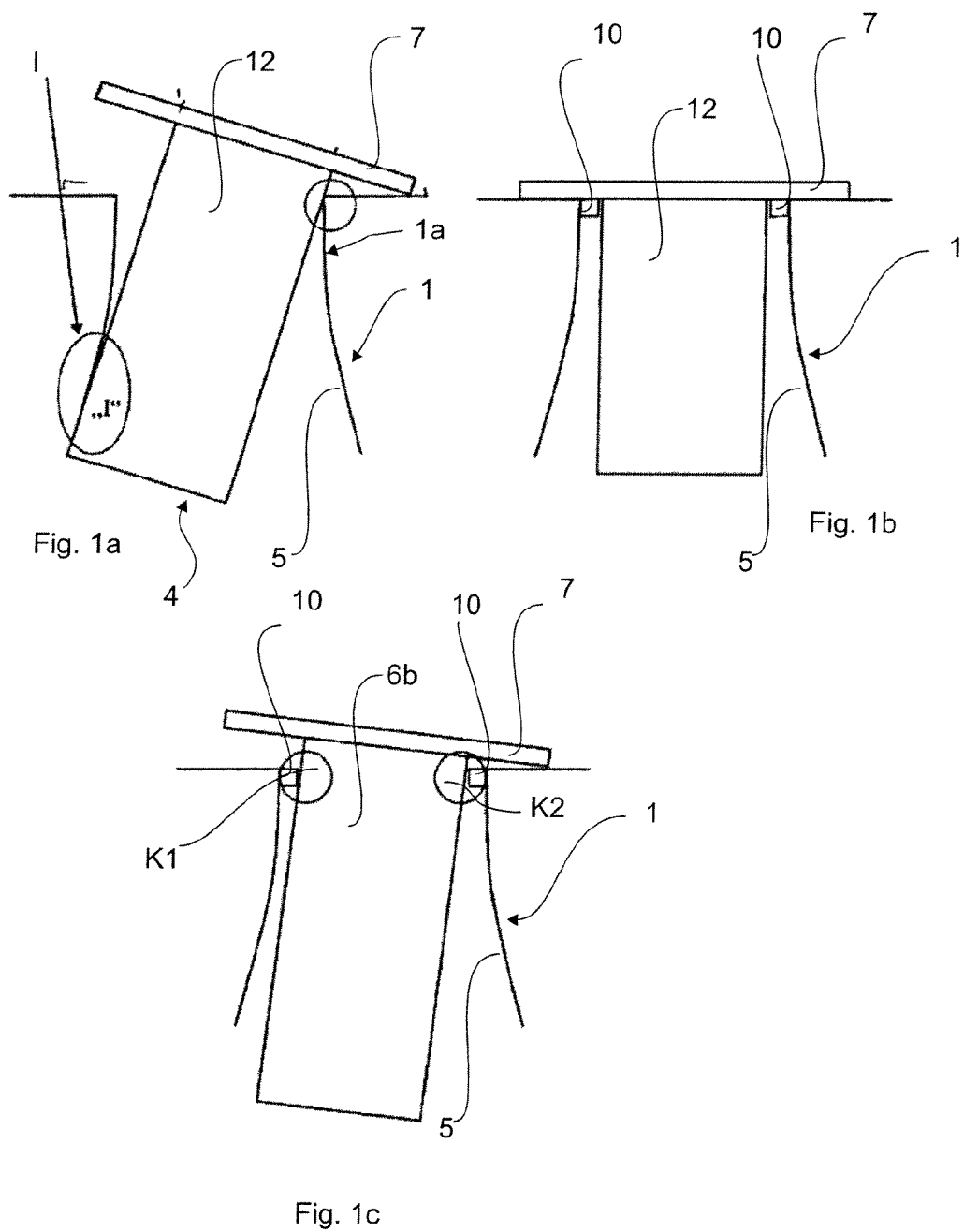
FIGS. 1a-1c show three diagrams to illustrate the disclosed idea.

FIG. 1a shows a part of a container 4 in a blow mold 1 according to the state of the art. Of the container, only a collar 7 and a short section of the bottleneck and/or neck area 12 of the container 4 are shown here. Above the collar 7 there is a bottle thread (not shown) and beneath the neck area 12 is the belly (not shown) of the bottle. Likewise, only a portion of the blow mold 1 according to the state of the art is shown here. As shown in FIG. 1a, there is a relatively great play between the container 4 and/or the neck area 12 of the container 4 and the neck 1a of the blow mold 1. If the tilting of the container 4 with respect to the blow mold 1 as shown in FIG. 1a occurs now, one-sided contact may occur between the container 4 and the blow mold 1, or more precisely, between the neck area 1a of the blow mold 1 and the neck area 12 of the container 4. This is illustrated by reference numeral I.

Since the blow mold 1 and/or its inside wall 5 is cooler in comparison with the container 4, the container 4 cools in the area labeled as 1. As a result, the container 4 has a one-sided accumulation of material (quenching lens) beneath the collar 7 after the stretch blow molding operation.

FIG. 1b shows schematically a disclosed blow mold 1. This disclosed blow mold 1 additionally has a spacer device 10. This spacer device 10 reduces the mold gap between the container 4 and the blow mold 1 and/or the neck area 12 of the container 4 and the neck area 1a of the blow mold 1. In the case of tilting of the container 4 with respect to the blow mold 1, the spacer device 10 prevents the container 4 from coming in contact with the blow mold 1, as shown in FIG. 1c. In this case, there is contact between the spacer device 10 and the area of the container 4 directly beneath the collar 7, as illustrated by the two circles K1 and K2. However, this contact is not problematical because the plastic material is relatively cold in this area and participates very little or not at all in the stretch blow molding operation. It should be noted here that the heating of the container 4 is ideally limited to the area beneath the collar 7 and the preform already has its final shape in the area above the collar 7 even before the stretch blow molding operation. Thus, on the whole, a narrowing beneath the collar 7 and/or the ring of the blow mold 1, which is not shown in detail in FIG. 1c, is proposed. The development of the quenching lens described above can thus be prevented through the narrowing according to the present disclosure. The spacer device 10 preferably has a length of between 0.5 mm and 8 mm, preferably between 1 mm and 4 mm and more preferably between 1.5 mm and 3 mm in the longitudinal direction of the container 4.

FIG. 2a shows an example of a plastic container 4 that is to be blow molded. This plastic container 4 has the collar 7, which was already shown in FIGS. 1a and 1c and is supported with respect to the blow mold 1. Directly beneath the collar 7, the neck area 12 is provided, opening into a body 11 of the container 4 via an inclined area. Reference numeral 13 refers to the bottom of the container 4 and reference numeral 8 refers to the thread. FIG. 2b shows a top view of the conditions from FIG. 2a along line A-A from FIG. 2a. It can be seen here that in this case, the container 4 has a rectangular shape with rounded corners, but the present disclosure is not limited to this cross section. Reference notation L denotes the longitudinal direction of the container.

FIG. 2c shows a partial view of a finished container 4, which was produced using a blow mold 1 according to the present disclosure.

FIG. 2d shows a detailed diagram of the area C from FIG. 2a. It can be seen here that a radially constricted area 12a of the neck area 12 is formed by the spacer device 10. In addition, there is an area 12b that is unchanged radially. The radial distance R between the areas 12a and 12b results from the radial width of the spacer device 10, as will be shown below.

Figure 3A:
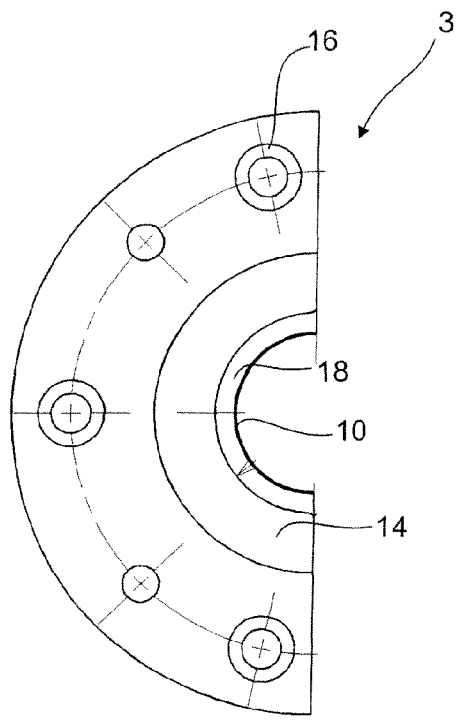
FIG. 3a shows a top view of an disclosed ring half.

FIG. 3a shows one half of a disclosed ring 3 which is arranged on the upper end of the blow mold 1, which is shown only schematically in FIGS. 1a through 1c. This ring 3 may be screwed onto the blow mold 1. To this end the ring 3 has boreholes 16. The ring 3 may therefore be separated from the respective blow mold and replaced by another ring 3 having different diameters, for example.

Figure 3B:
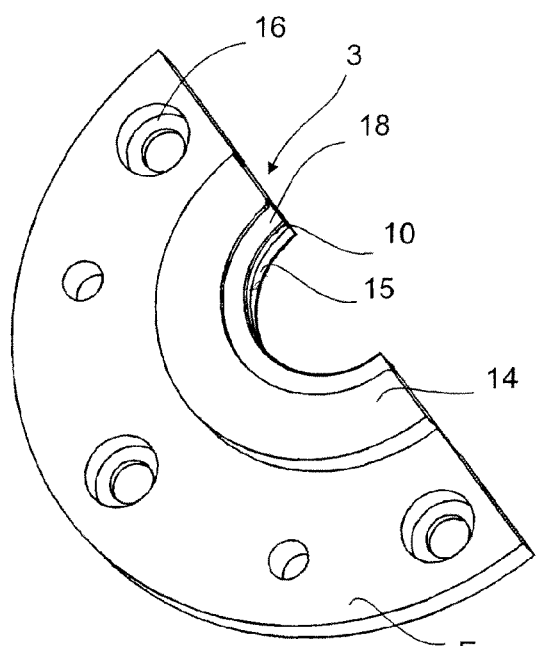

The reference numeral 18 refers to a circumferential edge of the ring 3, on which the collar 7 of the container 4 is supported (see FIGS. 2a-2c). Reference numeral 10 denotes the spacer device. Reference numeral 14 refers to an area that is elevated with respect the plane E of the ring 3. The elevated area 14 serves to create a cylindrical section 15, which is shown in FIG. 3b and is connected directly to the spacer device 10.

The ring 3 may be manufactured as a one-piece part. With the rings 3 known from the state of the art, only the cylindrical section 15, which is arranged at a right angle to the plane E, as mentioned above, is connected to the circumferential edge 18. The disclosed spacer device 10 is arranged in the upper area, i.e., in the area of the cylindrical section 15 facing the collar 7 of the container 4. This spacer device 10 does not prevent the blow mold 1 from closing.

Figure 3C:
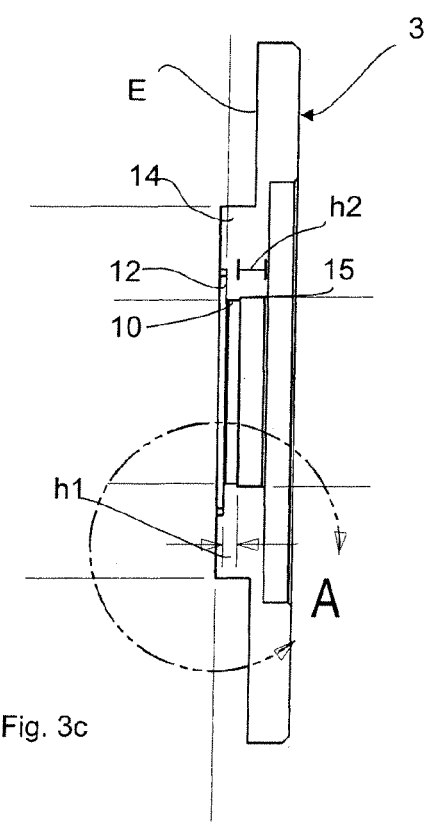

FIG. 3c shows a side view of a disclosed ring 3. Here again, the elevated area 14 which is supported opposite the plane E and/or the base of the ring 3 can be seen. Likewise, the cylindrical section 15 in which the area 12 of the container is located during the stretch blow molding operation can also be seen. It can be seen here that the height h1 of the spacer device is less than the height h2 of the cylindrical section below it. The height h1 is in the range between 1 mm and 3 mm and preferably between 1.5 mm and 2.5 mm.

Figure 3D:
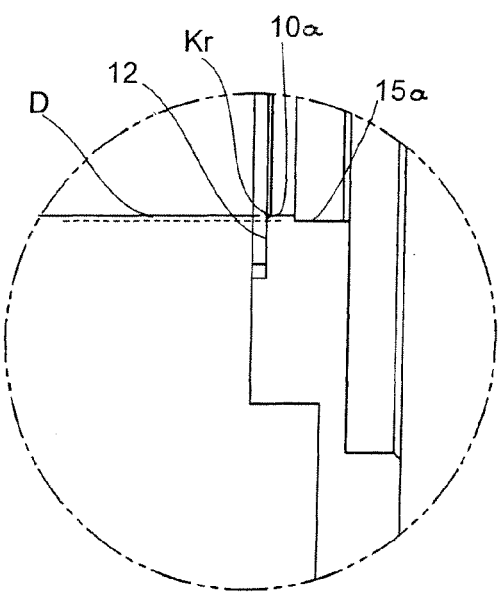
FIG. 3d shows a detailed view of the detail A from FIG. 3c.

FIG. 3d shows a detailed diagram of area A from FIG. 3c. Reference notation D refers to the distance from the wall 10a of the spacer device 10 to the wall 15a of the cylindrical section. The distance D is in a range between 0.2 mm and 1.2 mm, preferably between 0.4 mm and 1 mm and especially preferably in the range of 0.8 mm.

As stated above, this distance D leads to the radial distance R in FIG. 2. This choice of the area has proven to be especially favorable for preventing the development of the aforementioned quenching lenses on the one hand, while on the other hand not excessively interfering with the production of the container 4. As shown in FIG. 3d in particular, the transition between the spacer device 10 and the cylindrical section 15 is sharp-edged and is preferably also free of burrs. Due to this sharp-edged transition, the onset of the aforementioned tilting of the container 4 with respect to the blow mold 1 can be prevented in an especially advantageous manner.

The radius of curvature Kr is in the range between 0.2 mm and 0.4 mm and preferably in a range between 0.25 mm and 0.35 mm. It should be pointed out that the precise dimensions of the spacer device 10 and/or of the cylindrical section 15 have been determined as a result of extensive experiments and tests, and additional process parameters such as the temperature of the container 4 in particular had to be taken into account.

All the features disclosed in the patent application documents are herewith claimed as essential to the disclosure if they are novel in comparison with the prior art when used individually or in combination.

The invention claimed is:

1. Blow mold (1) for producing plastic containers (4), comprising a base body, and an inside of the base body where a body (4a) of the container (4) to be produced can be accommodated, an inside wall (5) of the base body which completely surrounds the container to be produced, a ring (3) for supporting a neck of the container (4) with respect to the blow mold (1), and a spacer device (10) protruding inward with respect to a circumferential edge (18) of the ring (3) is provided on the ring (3), the spacer device (10) preventing the body of the container (4) from coming in contact with the inside wall (5) of the blow mold (1) in the event of tilting of the container (4) with respect to the blow mold (1), wherein the spacer device (10) reduces a mold gap between a neck area (12) of the container (4) and a neck area (1a) of the blow mold (1).

2. Blow mold (1) according to claim 1, wherein the spacer device (10) is designed as a ring (3) which completely surrounds a section of the container (4).

3. Blow mold (1) according to claim 1, wherein the spacer device (10) is flush with the circumferential edge (18) at the top.

4. Blow mold (1) according to claim 1, wherein the spacer device (10) has a rectangular cross section in its circumferential direction.

5. Blow mold (1) according to claim 1, wherein the spacer device has a length between 0.5 mm and 8 mm in the longitudinal direction (L) of the container (4).

6. Blow mold from (1) according to claim 1, wherein the circumferential edge (18) and the spacer device (10) are arranged on a ring (3).

7. Ring (3) for a blow mold (1), comprising a planar circumferential edge (18) on which a collar (7) of a container (4) that is to be treated can be supported, a cylindrical section (15) that extends perpendicular to the plane of the circumferential edge (18), and a spacer device (10) protruding radially inward with respect to the cylindrical section (15) and provided on the cylindrical section (15), wherein the spacer device (10) reduces a mold gap between a neck area (12) of the container (4) and a neck area (1a) of the blow mold (1).

8. Ring (3) according to claim 7, wherein the spacer device (10) has a circular cross section.

9. Blow mold (1) according to claim 5, wherein the length is between 1 mm and 4 mm.

10. Blow mold (1) according to claim 5, wherein the length is between 1.5 mm and 3 mm.

11. Ring (3) for a blow mold (1), comprising a planar circumferential edge (18) on which a collar (7) of a container (4) that is to be treated can be supported, a cylindrical section (15) that extends perpendicular to the plane of the circumferential edge (18), and a spacer device (10) protruding radially inward with respect to the cylindrical section (15) and provided on the cylindrical section (15), wherein the spacer device (10) has a circular cross section.

12. Ring (3) according to claim 11, wherein the spacer device (10) is flush with the circumferential edge (18) at the top.

13. Ring (3) according to claim 11, wherein the spacer device has a length between 0.5 mm and 8 mm in the longitudinal direction (L).

14. Ring (3) according to claim 13, herein the length is between 1 mm and 4 mm.

15. Ring (3) according to claim 13, wherein the length is between 1.5 mm and 3 mm.

* * * * *